United States Patent [19]

Simms

[11] 3,713,743
[45] Jan. 30, 1973

[54] FORWARD SCATTER OPTICAL TURBIDIMETER APPARATUS

[75] Inventor: R. John Simms, Menlo Park, Calif.

[73] Assignee: Agricultural Control Systems, Redwood City, Calif.

[22] Filed: Nov. 25, 1970

[21] Appl. No.: 92,707

[52] U.S. Cl. ................. 356/208, 250/218, 356/104
[51] Int. Cl. ............................................. G01n 21/26
[58] Field of Search ................. 356/36, 37, 102–104, 356/207–208; 250/218

[56] References Cited

UNITED STATES PATENTS

| | | | |
|---|---|---|---|
| 3,310,680 | 3/1967 | Hasegawa | 356/104 |
| 3,535,531 | 10/1970 | Neitzel | 250/218 X |
| 3,576,558 | 4/1971 | Devries | 356/104 X |
| 3,340,764 | 9/1967 | Bergson | 356/177 |
| 3,409,885 | 11/1968 | Hall | 356/104 X |
| 3,528,743 | 9/1970 | Scott et al. | 356/104 |
| 3,203,309 | 8/1965 | Skala et al. | 356/37 |
| 3,361,030 | 1/1968 | Goldberg | 250/218 X |
| 3,431,423 | 3/1969 | Keller | 250/218 |
| 3,506,360 | 4/1970 | Albert | 356/104 X |
| 3,518,437 | 6/1970 | Riggs | 356/207 X |

FOREIGN PATENTS OR APPLICATIONS

| | | | |
|---|---|---|---|
| 479,662 | 2/1938 | Great Britain | 356/104 |

*Primary Examiner*—Ronald L. Wibert
*Assistant Examiner*—F. L. Evans
*Attorney*—Lowhurst & Hamrick

[57] ABSTRACT

An optical turbidimeter including a light source for generating a ribbon-shaped light beam for transmission through a fluid process stream, a first light detector for measuring the intensity of the light beam after passage through the process stream, a second light detector responsive to light scattered in the forward direction by the direct beam, spatial filtering optics for focusing the scattered light only from a center section of the direct beam onto the second detector and electronic signal processing means responsive to the signals generated by the two detectors for developing an output signal proportional to the ratio of the scattered light to the transmitted light beam.

19 Claims, 6 Drawing Figures

INVENTOR
R. JOHN SIMMS
BY
Lowhurst & Hamrick
ATTORNEYS

INVENTOR
R. JOHN SIMMS
BY
Lowhurst & Hamrick
ATTORNEYS.

FORWARD SCATTER OPTICAL TURBIDIMETER APPARATUS

BACKGROUND OF THE INVENTION

The present invention relates generally to instrumentation for measuring the turbidity of a fluid and more particularly to a novel optical turbidimeter utilizing forward scatter principles to accurately provide turbidity data.

Among the prior art which may be of interest, are the U.S. Pat. Nos. to Sinclair 2,812,686, Keim et al 3,281,602, Muta et al 3,279,305, Hach 3,309,956, Ewing 3,364,812, Keller 3,431,423 and Albert 3,506,360.

Turbidity is the name given to one of the optical properties of a liquid and is related to the presence, nature and the amount of discrete aggregations of material different from the pure liquid carrier. Turbidity is usually observed as the degradation in the contrast of an image transmitted through the liquid (for example the Jackson candle technique) or as the percentage of light emerging from the sample at angles different from the direct transmitted direction (forward, perpendicular or back scattered detection). The physical phenomena contributing to the observed turbidity are absorption, specular and diffuse, surface scattering and diffraction by particles and bubbles. The relative contributions of each phenomenon depend strongly upon the physical and optical characteristics of the particles and the host medium and on the details of the observation technique.

In using a turbidity measurement to control or predict the optical appearance of the sample — without attempting to deduce the nature or concentration of the scatterers — it is only necessary to insure that the instrumental technique reproduces the conditions under which the product will be judged. For example, swimming pool water is likely to be faulted for poor image transmission, whereas a glass of beverage will probably be judged by narrow angle forward scattering from a distant source.

The direct measurement of transmission for turbidity determination is generally too low in precision and is affected by too many extraneous factors to be of any value except for high levels of turbidity. the usual techniques for turbidity measurement rely on the phenomena of back scattering, perpendicular scattering (Nephelometry) or forward scattering. Each of these techniques is differently affected by the physical and optical properties of the particles in question and it is not feasible in a general situation to expect correlation between the results obtained by using different techniques.

Two working units of turbidity have found some acceptance. These are the scale of Jackson turbidity units (JTU's) based on the Jackson candle technique and "parts per million of equivalent diatomaceous earth." The former is a purely optical scale and correlates fairly well with forward scattering measurements — no conclusion is drawn concerning the nature and concentration of the scattering particles. The latter scale attempts to perform this correlation and is therefore suspect. However, the requirements of production related turbidity problems have led to its widespread use.

When the measurement goal is optical in nature, the JTU scale is effective and forward scattering techniques are suitable for the related instrumentation. Most subjective turbidity judgments are made under these conditions since the scattering effects are often several orders of magnitude larger in intensity than for perpendicular or back scattering effects. However, the difficulty of designing reliable forward scatter instruments which are not affected by stray light or unwanted scattering sources has heretofore prevented the technique from achieving the widespread use required for credible utilization of turbidity measurements in quality control.

SUMMARY OF THE INVENTION

In accordance with a preferred embodiment of the invention, a narrow, ribbon-shaped beam of light is passed through the fluid of which the turbidity is to be measured and is received by a first or transmitted beam detector which provides a first output signal commensurate with the light content of the transmitted beam. The thickness of the beam of light is selected as thin as practically possible, in the direction of fluid flow, taking into account such factors as desired light output and practical beam shaping means, to allow for best bubble rejection. Further, spatial filtering means is provided which receives the light which is forward scattered by the transmitted beam and which passes only the light scattered by a selected portion of the center section of the transmitted beam to a second or scattered light detector which provides a second output signal commensurate with the light content of the forward scattered light of the selected center portion of the beam. The ratio of the two output signals is then developed and provides a measure of the fluid turbidity.

It is therefore a principal object of the present invention to provide an optical turbidimeter apparatus for determining the turbidity of a fluid by spatially filtering the forward scattered light from a light beam passed through the fluid to eliminate the effects of observation window scattering and of other unwanted sources of scattered and reflected light.

Another object of the present invention is to provide an optical turbidimeter apparatus for measuring turbidity of a fluid process stream wherein the forward scattering of a sharply defined narrow beam of light, directed through the process stream, is detected separate from the directly transmitted beam of light to develop a ratio output signal which is proportional to turbidity and is independent of sample color and refractive index.

Still another object of the present invention is to provide an optical turbidimeter apparatus for measuring the turbidity of a fluid process stream which includes means for passing a sharply defined beam of light which is rectangular in transverse cross section through the process stream, means for detecting both the directly transmitted beam of light and the forward scattered light from a selected portion of the light beam, and means for providing an output signal proportional to the ratio of the scattered light to the directly transmitted light and which is independent of sample color and refractive index.

Still another object of the present invention is to provide an optical turbidimeter apparatus for measuring the turbidity of a fluid process stream which includes means for passing a sharply defined beam of light, which has as small a dimension as possible in the direction of flow of the process stream, means for detecting both the directly transmitted light and the light scattered in the forward direction from a selected portion of the process stream, means for providing an output signal proportional to the ratio of the scattered light to the directly transmitted light, and means to filter the output signal to remove therefrom the spikes caused by bubbles.

Other objects of the present invention will become apparent to those skilled in the art after having read the following detailed description of the preferred embodiment which is illustrated in the several figures of the drawing.

IN THE DRAWING

DETAILED DESCRIPTION OF THE PREFERRED EMBODIMENT

Figures 1, 2:
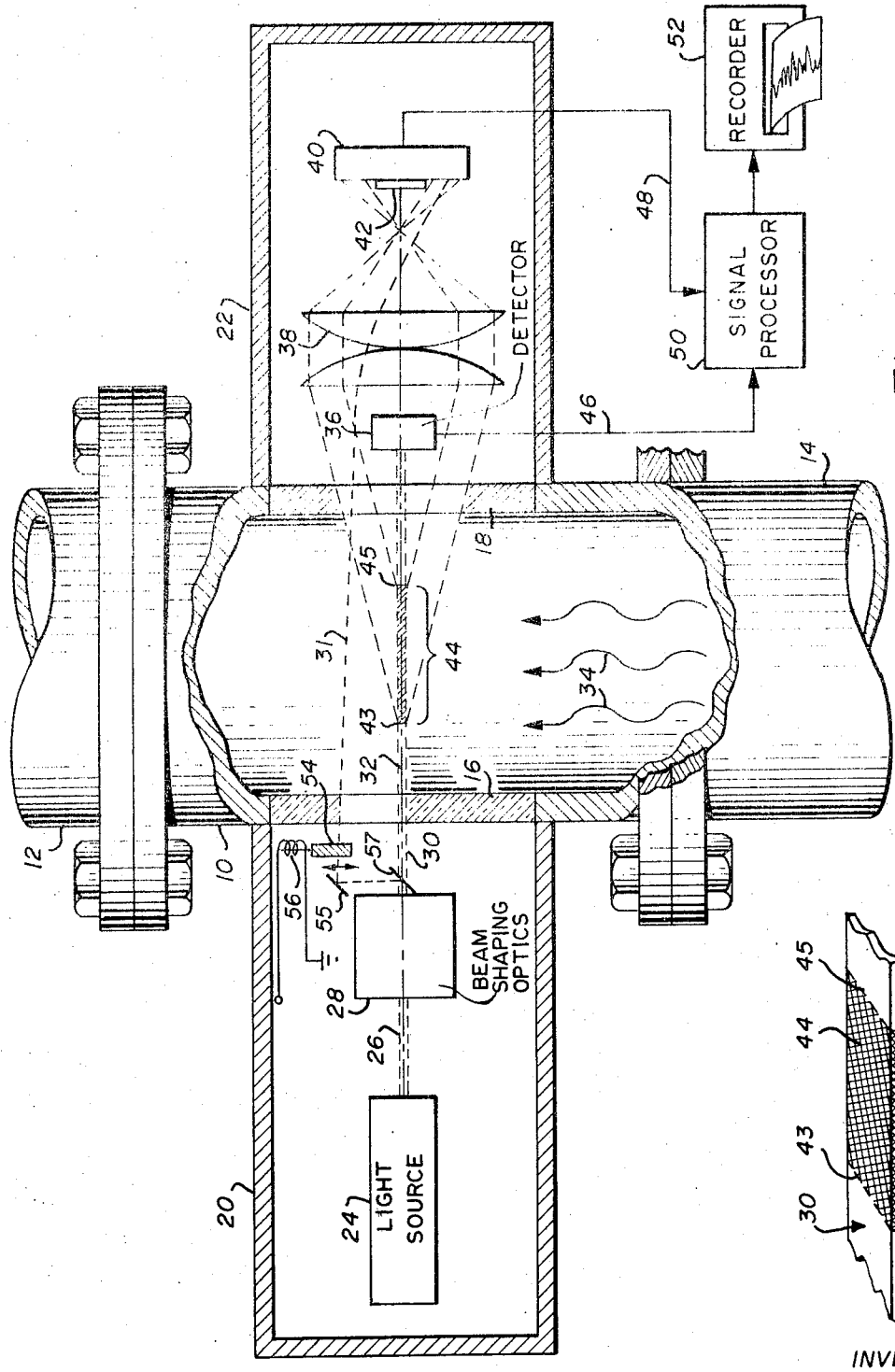
FIG. 1 is a cross section taken through a generalized embodiment of the turbidimeter of the present invention.
FIG. 2 is a detail illustrating the shape of the light beam passed through the flow stream in accordance with the present invention.

Referring now to FIG. 1 of the drawing, there is shown a preferred embodiment of the turbidimeter apparatus of the present invention suitable for use in continuously monitoring the turbidity of a fluid process stream. The apparatus includes a short flanged section of conduit 10 which can be bolted to the end flanges of the conduits 12 and 14 for in-line monitoring applications. Provided in opposite walls of the section 10 are sight glass windows 16 and 18. A light source housing 20 is affixed to section 10 adjacent sight glass window 16, and a light receiver housing 22 is mounted to section 10 about sight glass window 18. Included within housing 20 is a source of light 24 which is preferably a laser, but may alternatively be comprised of an incandescent filament lamp or other source of visible, ultraviolet or infrared radiation for generating a beam of light 26.

Positioned between light source 24 and window 16 are special beam shaping optics 28 which convert light beam 26 into a thin ribbon-shaped beam of light 30 which is transmitted along an optical axis 32 passing through entrance window 16, the process stream 34 and exit window 18. The ribbon-shaped configuration of light beam 30 is illustrated in FIG. 2 of the drawing. For reasons explained hereinafter in connection with bubble rejection, the ribbon thickness, in a direction parallel to fluid flow, is made as thin as practically possible, and normally but not necessarily occupies at least 50 percent of the cross-sectional area of the stream 16. For bubble rejection, a thickness of less than 5mm. is desirable and about 2mm. has produced good average measurement of turbidity of the stream.

Positioned within the receiver housing 22 and spaced, in that order along the optical axis 32, is a first or direct beam light detector 36, an imaging lens system 38, a second or scattered light detector 40 and a masking element 42 dispose and covering the light sensitive face of detector 40. Detector 36 is a strip detector for receiving only the transmitted light beam 30 which passes through process stream 34. Imaging lens system 38, detector 40 and mask 42 in combination provide a field defining spatial filtering system which focuses light scattered from a particular portion 44 of light beam 30 onto the light sensitive face of detector 40. Whereas the outer periphery of the light sensitive face of detector 40 cooperates with system 38 to define the rearmost edge 43 of light beam portion 44, masking element 42 cooperates with the system 38 to define the foremost edge 45 of light beam portion 44 by preventing scattered light eminating from any portion of light beam 30 other than portion 44 from reading the scattered light detector. The spatial filtering system thereby further insures that no scattered light from the entrant and exit window surfaces reaches second detector 40.

The positions and sizes of the masking element 42 and detector 40 may be rearranged with respect to the focal plane of system 38 to either lengthen, shorten or change the extremities of portion 44. This invention is not intended to be limited to the particular embodiment illustrated, but includes all such systems wherein the size and position of lenses, masking element and detectors define the regions along the optical axis from which scattered light is accepted by the detectors or define regions from which scattered light cannot reach the detectors.

The output signals generated by detectors 36 and 40 are coupled by leads 46 and 48, respectively, to a suitable signal processor 50 wherein the two signals are amplified, detected and demodulated, if necessary, and wherein their ratio is computed. The resultant ratio output signal may be used to drive a recorder 52. which provides a permanent record of the turbidity of the process stream. The ratio computation results in a signal which is independent of source fluctuations, line voltage variations and other environmental factors which would otherwise affect the calibration stability. The synchronous demodulation, if employed, of both signals further increases the long term stability and provides a high degree of noise immunity, yet enables the system to respond with a time constant on the order of 0.1 seconds.

In the preferred embodiment, a calibration shutter 54 and reflectors 55 and 57 may also be provided within light source housing 20 so as to permit accurate calibration of the apparatus. Calibration is accomplished by depressing a push button at a control panel which energizes a relay 56 to remove the shutter 54 from the path of light beam 31. This permits a calibrated percentage of the light beam 30 to be projected onto the scattered light detector 40 resulting in a simulated turbidity signal of known strength. The gain control of signal processor 50 is then adjusted to provide a corresponding increase in the output of recorder 52 or other associated readout meters. This is typically a 10 second operation and need only be performed at infrequent intervals.

The turbidimeter apparatus of the present invention, since unaffected by stray light or unwanted scattering sources, makes for creditable utilization of turbidity measurements in quality control operations and the operator can now be certain that his turbidity measurements correlate well with the JTU scale and with optical phenomenon observed by the consumer of the product in question. By way of comparison, the 90° and back scatter techniques of the prior art do not exhibit this correlation and thus make forward scatter instruments preferable for these types of measurements.

Although the optically consistent JTU scale does not by itself indicate the nature of concentration of the scattering particles, the scattering signals from a specific type of particle in a single medium will, in the low turbidity range, be proportional to particle concentration. This is all that is required in a situation such as the monitoring of a production process, e.g., filtration, and is the basis of the "parts per million equivalent diatomaceous earth" scale. The turbidity readings for a single product type, after a uniform treatment process, can normally be mutually correlated, thus providing the necessary production control, but the readings usually will not correlate with those for a different medium or for different sizes and types of scattering particles. For example, the curve of turbidity vs. ppm. rust particles in water will enable the concentration of these rust particles to be controlled but will be different from the calibration curve for rust particles of considerably different sizes for clay particles and for asbestos particles. These limits are inherent in the basic interaction of light with matter and cannot be circumvented by an optical scattering measurement alone. However, as long as those limitations are understood, the measurement of turbidity by the forward scattering technique is ideal for the monitoring of specific operations such as filtration, settling or coagulating efficiency and will provide the necessary data for determining the optical turbidity or clarity of the outgoing product. Conversely, the comparison of turbidity measurements between different laboratories, plants or industries will indicate the correct degree of correlation between the optical variable of turbidity (in JTU's) or its relative equivalent in ppm. diatomaceous earth, but will not necessarily reveal information on the nature or concentration of the scattering particles.

Figure 3:
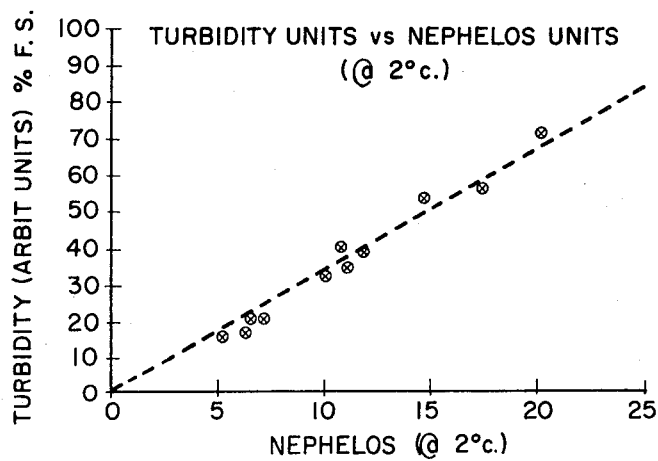
FIG. 3 is a chart showing correlation between Nephelos Units and Turbidity Units obtained in accordance with the present invention.

A series of extended experiments was conducted to establish the correlation between data obtained from the turbidimeter of the present invention, using forward scattering principles, and Nephelos readings obtained from a standard laboratory Nephelometer utilizing perpendicular scattered light. The samples were beer, varying degrees of filter processing and with different intensities of chill haze. The suspended matter generating the scattered signals was a mixture of protein agglomerations (causing the chill haze), diatomaceous earth and filterable organic particulates. The sample temperature at the turbidimeter was 2°C and since the chill haze contribution was significant, the sample temperature for the Nephelometer readings had to be held at 2°C. The design of the Nephelometer necessarily results in an uncertain sample temperature and this factor represents the greatest source of error in the experiments. In practice, the Nephelometer samples were between 2°C and 4°C for the measurements. However, a 2°C difference in sample temperature resulted in a 1 unit change in Nephelometer reading. The uncertainty in turbidity reading is equivalent to ± 0.1 Nephelos Units. As shown in the results illustrated in FIG. 3 of the drawing, the correlation holds over the range studied within the experimental error of the Nephelometer.

The conclusion to be drawn from this data is that for the type of sample and the scattering particulates of this study the turbidimeter of the present invention can be directly calibrated in Nephelos, or some other 90° scattering unit, and can be operated for process control purposes with standards and limits based on 90° scattering techniques. This degree of correlation between data obtained from the two instrumental techniques is expected for any group of samples of a single type of scatter in a single medium. However, when different types of scattering particles are encountered, the mutual correlation is expected to decrease. As pointed out above, the turbidimeter data is expected to follow the ppm. concentration of the scatter more closely than the data from a 90° system.

Figure 4:
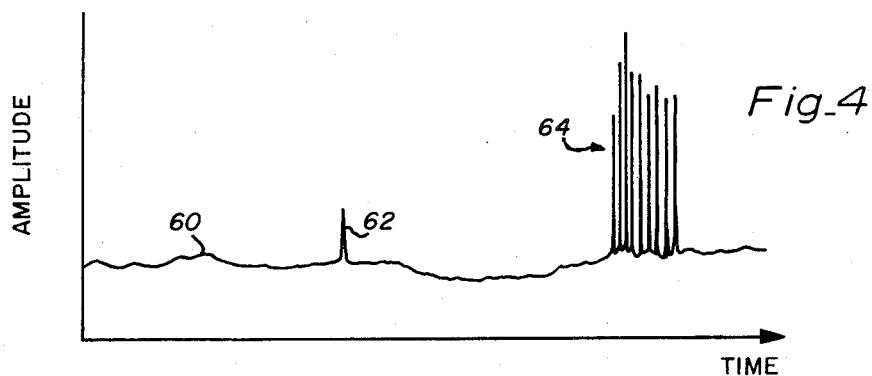
FIG. 4 is a graph illustrating turbidimeter output and showing superimposed spikes caused by the presence of bubbles in process stream.

A typical output curve of the type obtained from the preferred embodiment of the turbidimeter is illustrated in FIG. 4 of the drawing. The curve 60 illustrates the generally slowly varying and occasionally spiked DC output, representing the ratio of the first and second output signals as provided by processor 50, responsive to the turbidity of the fluid process stream. The single spike 62 and the multiple spikes 64 are typically the results of bubbles appearing in the process stream. As long as the ribbon of light crossing the process stream is narrow, say about 2 millimeters thick in the direction of the stream flow, bubbles in the stream cause short spurious signal spikes or pulses 62 and 64 superimposed on the otherwise steady turbidity signal. These spikes, which are primarily in the scattered beam signal, can be filtered, if so desired, by the addition of a simple electrical filter circuit. In the case of a thick ribbon of light, the number of bubbles is of course much greater and the effect of such bubbles is a wide pulse, like a continuum, which is very difficult to filter. Accordingly, bubble rejection requires a very thin ribbon of light so that bubbles cause a sharp spike disturbance which can readily be filtered.

Figure 5:
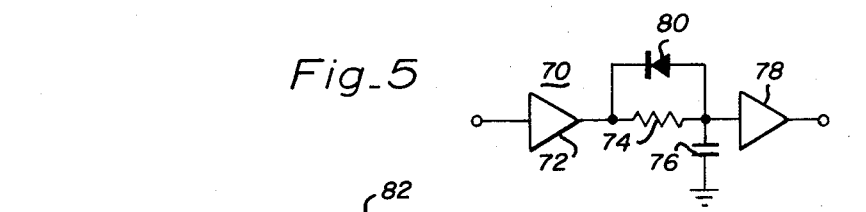
FIG. 5 is a schematic diagram of an electronic integrator circuit utilized to reject bubble responsive spikes in the output signal from the direct beam detector.

One such filter circuit is illustrated in simplified form in FIG. 5 and is used preferably to couple processor 50 to recorder 52. Circuit 70 includes a first amplifier 72 which amplifies the processor output signal and feeds it through an integrator, comprised of a resistor 74 and capacitor 76, and through a second amplifier 78. A diode 80 is shunted across resistor 74 and is back biased by any positive going peaks in the detector output and forward biased by any negative going signals therein. The circuit thus operates to effectively eliminate spikes in the output which are attributed to bubbles. Such circuitry is usually not required in in-line systems since the normal use of bubbles encountered with sampling turbidimeters — the evolution of disolved gas bubbles due to the drop from line pressure to atmospheric — is usually not encountered with the in-line system because the sample remains at line pressure. It should, however, be pointed out that just as the spike rejection circuit can be utilized to eliminate the effect of bubbles in the flow stream, appropriate circuitry can likewise be used to evaluate the size of the bubbles or other particulate matter, since the size thereof will have a definate relationship to the parameters of the pulse-shaped signals.

The output signals from the apparatus of the present invention can be used for monitoring the efficiency of filtration operations, for informing the operator when precoat filters are ready for use, or at the end of their life, for automatic redirection in the event of filter breakthrough or process failure, and for part of the control operation in completely automatic filtration systems. The continuous record produced by the apparatus is available for identifying the high turbidity points in the process cycle for corrective action, for production planning and quality assurance requirements. Many of these functions are not now performed, and those which are, usually rely upon subjective judgments based on no identifiable objective critera. However, the present invention now provides the capability for establishing all these operations on a rational, scientific and objective basis.

Figure 6:
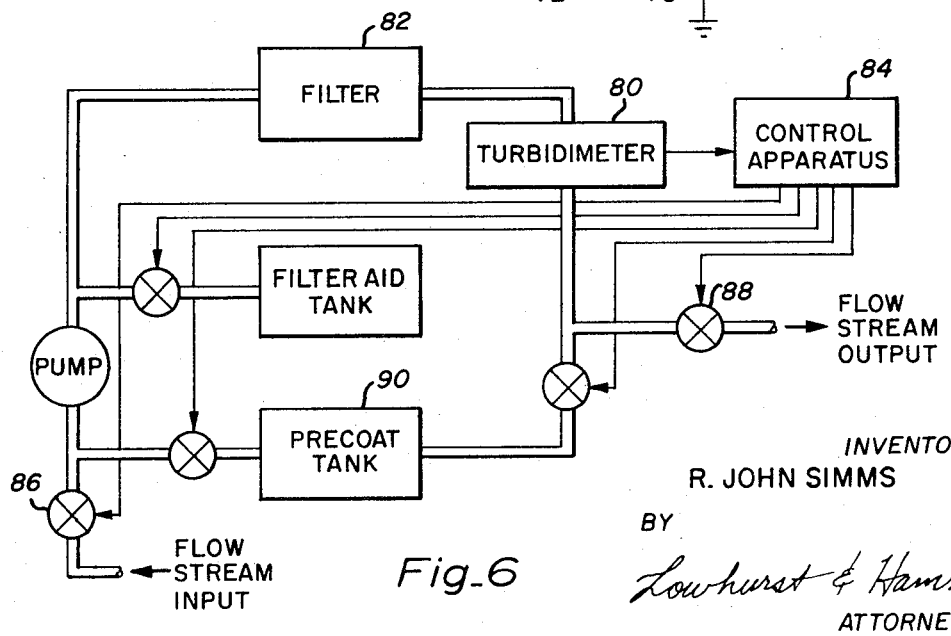
FIG. 6 illustrates in diagram form a fluid processing system in which the present invention is utilized to monitor the turbidity of the process stream.

The turbidimeter of the present invention is ideal for monitoring and/or controlling the turbidity parameter in industrial filter operations. Since the purpose of such a filter is to remove suspended material from the process stream, a measurement of the output turbidity is the only direct method of evaluating the performance of the filter. The turbidimeter is thus used for monitoring and controlling the precoat cycle of the filter, to switch the filter on-stream when the precoat cycle is complete, to monitor for filter breakthrough, to switch the unit into recirculation in the event that breakthrough occurs, to return to on-stream operation when the filter is resealed, and to signal the end of the on-stream phase if this results from a deterioration in output turbidity. A simplified block diagram of an automatically controlled system is illustrated in FIG. 6 of the drawing.

In this system, the turbidimeter 80 monitors the output of filter 82 at all times. In the event that the control apparatus 84, which is responsive to the turbidimeter 80, senses excessive turbidity the main input valve 86 and output valve 88 are shut off and the closed loop through the empty precoat tank 90 is established. The filter will then self-heal during the recirculation and once the output turbidity has improved control apparatus 84 will reopen valves 86 and 88 and the on-stream operation will be resumed.

If bubbles are anticipated in the filter output, it is recommended that the bubble rejection circuitry illustrated in FIG. 5 be included in the turbidimeter data processing package. It is also suggested that when large receiving tank volumes are used the control system includes an instant-reset time delay responsive to the alarm signal generated thereby. This will insure that an alarm condition must continuously exist for the duration of the time delay before the recirculation operation is actuated. In this case, short periods of excessive turbidity, which can perhaps be tolerated, do not interrupt the process.

To render the operation of such a filter system automatic, the parameters to be monitored should be turbidity, pressure drop across the filter, flow rate and possibly a cake thickness monitor. The first three variables are conducive to measurement by external transducers and these can be retrofitted to an existing system. The last parameter is less important for the routine operation of the filter and in most cases be included in the fabrication of the filter if pressure certification is necessary. The three important variables are reducible to three threshold levels with a possible interrelationship between the flow rate and the pressure differential thresholds.

The operation of the various valves is controlled by the three digital conditions of these thresholds and the control apparatus can be relatively straight forward. However, it is not necessary to convert the filter operation to automatic control to achieve the benefits of the turbidity monitor. Since the turbidity signal is the only measurement of efficiency of the removal of suspended solids, a turbidity signal which exceeds the threshold can actuate an alarm to attract the operators attention. During the precoat cycle, the operator is already concerned with the turbidity. The use of the monitoring system with a meter or recorder display will thus enable him to judge the end of the precoating operation by an objective bubble free measurement of the turbidity. The present invention provides this means of objective measurement free of the source of error encountered using prior art systems and is specially designed for the type of application.

While the principal purpose of the invention is to provide an improved means for making turbidity measurements, the apparatus is readily adaptable for use in other applications. For example, any application wherein the continuous monitoring of a fluid process stream for irregularities or the specific detection of particular size particles or objects suspended within such process stream is considered to be within the scope of the invention. The source of illumination in the form of a laser beam is very attractive since it requires no special shaping optics and is very narrow, and therefore eminently suitable for bubble rejection.

The disclosure of signal conditioning electronics, which detect the presence of spikes in the output of the light detectors, is not intended to limit the invention to the rejection of spikes produced by the presence of bubbles. The presence of any large particle or aggregation of particles or material which varies and is much greater in size than the material under examination can also be detected and their electrical effect can be electronically rejected. Conversely, since the presence of bubbles and large particles or aggregations of particles and material can also be detected by the invention, such presence can be recorded by a readout device for observation and analysis by the user.

Moreover, the apparatus is not limited to use of a thin ribbon of light and in these applications in which bubbles form no problem, it will undoubtedly be found desirable to utilize a beam of light having a thicker cross section. One of the reasons for the preferred use of beams of rectangular cross section is the ability of the system to properly evaluate the presence of bubbles and other particulate matter in the flow stream if the end faces are parallel to fluid flow. For example, if a circular beam of light were utilized, a bubble or portion of a bubble might pass through only a very small cord of the beam cross section and would therefore not provide a meaningful indication in the output. However, where a rectangular beam is utilized, a bubble in the process stream is more likely to pass through the entire beam if it passes through the beam at all, and thus more accurate data concerning the bubble can be obtained.

Neither is the present invention limited in application to measuring turbidity in the main process stream of a fluid system since it can be used with equal efficacy in a side stream or in a batch sampling system. Similarly, there is no intended limitation to use of the present invention in making measurements of moving sample streams since the invention can also be used to make static fluid measurements wherein a test tube or other sample container is inserted into the path of the light beam. In other words, chamber, as used in the claim is intended to mean any means for containing a sample fluid so that the light beam may be passed through it.

After having read the above disclosure of a preferred embodiment, it is contemplated that many alterations and modifications of the invention will become apparent to those skilled in the art. Accordingly, the invention is not to be limited to the particular embodiments disclosed, and the appended claims are to be interpreted as covering all modifications and applications thereof which fall within the true spirit and scope of the invention.

What is claimed is:

1. A forward scatter optical turbidimeter comprising:
    a chamber for containing a liquid fluid sample the turbidity of which is to be evaluated, said chamber having opposite wall portions which are radiation transparent;
    means for defining a radiation axis through said transparent wall portions;
    source means disposed on one side of said chamber for developing a beam of radiation and for directing said beam of radiation across said chamber through said wall portions along said radiation axis;
    first radiation detector means disposed along said radiation axis on the other side of said chamber for receiving said beam of radiation and for generating a first output signal commensurate with the intensity of said beam of radiation after transmission through said fluid sample;
    second radiation detector means disposed along said radiation axis on the side of said first detector means opposite said chamber;
    spatial radiation filtering means disposed between said first and second detector means, said spatial radiation filter means being arranged and dimensioned to project only the radiation scattered in the forward direction from a predetermined longitudinal segment of said beam of radiation which lies wholly within said chamber and is spaced inwardly from said wall portions onto said second detector means, said second detector means generating a second output signal commensurate with the intensity of the received forward scattered radiation; and
    signal processing means responsive to said first and second output signals and operative to provide an indication of the turbidity of said sample.

2. A forward scatter optical turbidimeter as recited in claim 1 wherein said source means includes beam shaping means for shaping said beam of radiation into a flat ribbon which is substantially uniform along its length.

3. A forward scatter optical turbidimeter as recited in claim 2 wherein said beam of radiation has a thickness of less than 5 millimeters along the flat portion of said ribbon.

4. A forward scatter optical turbidimeter as recited in claim 3 wherein said beam of radiation has a transverse width sufficient to occupy at least 50% of the effective cross-sectional area of said chamber through which said light beam passes.

5. A forward scatter optical turbidimeter as recited in claim 1 and further including a calibration means for permitting a predetermined amount of light, in the form of a calibration beam, to pass through said chamber and only onto said second detector means.

6. A forward scatter optical turbidimeter as recited in claim 1 in which said spatial radiation filtering means includes, an imaging lens system for imaging the scattered radiation onto said second detector means, and a limiting means cooperating with said second detector means to restrict the imaged radiation to an annulus whose inner and outer diameters correspond, respectively, to the near and far end portion of said longitudinal segment.

7. A forward scatter optical turbidimeter as recited in claim 6 in which said limiting means includes a central mask overlying said second detector means for defining the inner diameter of said annulus.

8. A forward scatter optical turbidimeter as recited in claim 6 in which the radiation sensitive portion of said second detector means extends to and defines said outer diameter of said annulus.

9. A forward scatter optical turbidimeter for monitoring the turbidity of a flowing liquid comprising:
    a flow channel through which the flowing liquid is passed, said flow channel having opposite wall portions which are optically transparent;
    means for defining an optical axis through said transparent wall portions transversing said flow channel;
    light source means disposed on one side of said flow channel for developing and projecting a light beam, having a ribbon-like, substantially uniform cross section along its length, along said optical axis;
    first light detector means disposed along said optical axis on the other side of said flow channel for receiving the light from said light beam which is directly transmitted and for generating a first output signal commensurate with the intensity such directly transmitted light;
    second detector means disposed along said optical axis on the side of said first detector means opposite said flow channel for receiving the light from said light beam which is scattered in the forward direction and for generating a second output signal commensurate with the intensity of such forward scattered light; and signal processing means responsive to said first and second output signals and operative to provide an indication of the turbidity of said fluid.

10. A forward scatter optical turbidimeter as recited in claim 9 wherein said light source means comprises a laser and a beam expanding means for developing said light beam.

11. A forward scatter optical turbidimeter is recited in claim 9 which further includes spatial optical filtering means disposed on the side of said first detector means opposite said flow channel portion, said filtering means being operative to project only the light scattered in the forward direction from a predetermined longitudinal segment of said light beam which lies wholly within said flow channel portion and which is spaced inwardly from said walls onto said second detector means.

12. A forward scatter optical turbidimeter as recited in claim 11 wherein said spatial optical filtering means includes, an imaging lens system for imaging the scattered radiation on said second detector means, and means to limit the area of sensitivity of said second detector means to an annulus whose inner and outer diameters correspond to the desired end portions of said longitudinal segments.

13. A forward scatter optical turbidimeter as recited in claim 9 which further includes a calibration means for permitting a predetermined amount of light, in the form of a calibration beam, to pass through said flow channel and only onto said second detector means.

14. A forward scatter optical turbidimeter as recited in claim 9 wherein the transverse cross section of said light beam is substantially rectangular and has a thickness in the direction of the flowing liquid which is less then 5 millimeters.

15. A forward scatter optical turbidimeter as recited in claim 9 wherein the width of said light beam is sufficient to occupy at least 50 percent of the effective cross-sectional area of said flow channel.

16. A forward scatter optical turbidimeter as recited in claim 9 wherein said signal processing means includes circuit means for electronically rejecting spurious signal excursions caused by bubbles in the flowing liquid.

17. A forward scatter optical turbidimeter as recited in claim 9 in which said light beam is made as thin in the direction of flow of the flowing liquid as is compatible with the sensitivity of said light detector means to provide a readable output signal.

18. A forward scatter optical turbidimeter as recited in claim 9 having a pair of side walls parallel to said optical axis and in which said light beam is made as wide in the direction transverse to the flowing liquid as is compatible with the transverse width of the flow channel without coming in contact with said side walls.

19. A forward scatter optical turbidimeter as recited in claim 9 in which the height of said light beam in the direction of fluid is less than one-half of the width of said light beam in the direction transverse to fluid flow.

* * * * *